US011898725B2

(12) United States Patent
Xue et al.

(10) Patent No.: US 11,898,725 B2
(45) Date of Patent: Feb. 13, 2024

(54) JEWELRY LIGHTING LAMP AND A JEWELRY LIGHTING METHOD

(71) Applicants: Wanjiong Lin, Zhejiang (CN); Self Electronics Co., Ltd., Zhejiang (CN); Self Electronics USA Corporation, Norcross, GA (US)

(72) Inventors: Yuanfang Xue, Zhejiang (CN); Huangfeng Pan, Zhejiang (CN); Junjun Ying, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 17/932,436

(22) Filed: Sep. 15, 2022

(65) Prior Publication Data

US 2023/0003364 A1 Jan. 5, 2023

Related U.S. Application Data

(63) Continuation-in-part of application No. 17/305,315, filed on Jul. 2, 2021, now abandoned.

(30) Foreign Application Priority Data

Jul. 1, 2020 (CN) ......................... 202010622733.4

(51) Int. Cl.
*F21V 14/02* (2006.01)
*F21V 7/04* (2006.01)
*F21W 131/405* (2006.01)

(52) U.S. Cl.
CPC ................ *F21V 14/02* (2013.01); *F21V 7/04* (2013.01); *F21W 2131/405* (2013.01)

(58) Field of Classification Search
CPC .......... F21V 7/04; F21V 14/02; F21V 14/025; F21W 2131/405
See application file for complete search history.

(56) References Cited

U.S. PATENT DOCUMENTS

| | | | | |
|---|---|---|---|---|
| 2005/0007761 A1* | 1/2005 | Eversley | F21V 14/02 362/35 |
| 2008/0094824 A1* | 4/2008 | Stack | A47F 3/001 362/125 |
| 2013/0188353 A1* | 7/2013 | Nankil | F21V 14/02 362/249.02 |
| 2018/0359954 A1* | 12/2018 | Millar | A01G 9/247 |
| 2019/0313497 A1* | 10/2019 | Wölfing | H05B 47/175 |

* cited by examiner

*Primary Examiner* — Thomas M Sember
(74) *Attorney, Agent, or Firm* — Wang Law Firm, Inc.

(57) ABSTRACT

A jewelry lighting lamp has a lighting part, a rotating part and a mounting part, the mounting part has a lamp barrel which accommodates the lighting part and rotating part. The rotating part has a driving motor, which drives the lighting part to rotate along the central axis of the lamp barrel; the lighting part has a main light source arranged on the central axis and one or more secondary light sources arranged around the main light source, the main light source and the secondary light source are driven by the rotating part to rotate along the central axis circumferentially. A jewelry lighting method using the jewelry lighting lamp is also provided. By varying luminance, the lamp solves the problem of visible light and shadows at the edge of the aperture when there are main and auxiliary light sources with different luminance.

14 Claims, 10 Drawing Sheets

JEWELRY LIGHTING LAMP AND A JEWELRY LIGHTING METHOD

FIELD OF THE TECHNOLOGY

The present invention relates to the field of lamps, in particular to a jewelry lighting lamp and a corresponding jewelry lighting method.

BACKGROUND

Among jewelry display lighting fixtures, existing solutions mainly use strip lamps or soft belts for lighting around the showcase, or use vertical pole jewelry lighting for highlighting key items. The former strip lamps provide general lighting in the showcase and the light is diffused around. As a result, the surrounding areas of the showcase are bright, but the jewelry in the middle fail to stand out due to an inability to focus light on the position occupied by the jewels, resulting in the inability to highlight the brightness of the jewelry. This hinders attracting the attention of consumers. The latter case of pole jewelry lighting is the opposite of bar-shaped lighting. It uses a spotlight, which highlights the existence of jewelry, but the light source having same and constant brightness cannot perfectly display the scintillating reflection characteristics of jewelry. Furthermore, the light beam can damage the eyes of consumers if reflected at the right angle.

Therefore, those skilled in the art are committed to developing a jewelry lighting lamp, which brings new experience when lighting jewelry while being imperceptible to the eye, so that consumers will not notice the shadows cast by the lamp while observing the light reflected by the jewelry.

BRIEF SUMMARY OF THE INVENTION

In view of the above-mentioned defects of the prior art, the technical problem to be solved by the present invention is the light and shadow problems and glare problems that exist in order to highlight the changes in the intensity of the light source due to the flickering of the jewelry when existing lamps illuminate jewelry.

To achieve the above purposes, the present invention provides a jewelry lighting lamp comprising a lighting part, a rotating part and a mounting part, wherein, the mounting part comprises a lamp barrel, which accommodates a lighting part and a rotating part; the rotating part comprises a driving motor, which drives the lighting part relative to the lamp along the central axis of the lamp; the lighting part comprises a main light source arranged on the central axis and a secondary light source arranged around the main light source. The main light source and the secondary light source are driven by the rotating part to rotate circumferentially around the central axis.

the main light source and the secondary light source respectively form a main light spot and an auxiliary light spot in the illuminated area, and for a single main light spot the brightness is $B_b$, the brightness of a single sub-spot is $B_a$, the sub-spot is always within the range of the main spot during rotation. The superposition formed by the main spot and the sub-spot forms a light spot having brightness $B_a+B_b$; the ratio of the brightness difference between the main light spot and the superimposed light spot $\Delta B=B_a$ and the brightness $B_b$ of the main light spot is defined as the brightness contrast $C=B_a/B_b$, and the brightness contrast C is less than the critical brightness contrast $C_{Pro}$.

the brightness contrast C is set to 0.02-0.05.

the lighting part comprises a light plate assembly and an aperture assembly, the light plate assembly comprises a light plate, and the aperture assembly comprising a reflector, the main light source and the auxiliary light source are arranged on the lamp board, and the main light source and the auxiliary light source are aligned with the reflector in the irradiation direction with one-to-one correspondence.

in the aperture assembly, the main light source is arranged corresponding to the first reflector, and the first reflector includes a circumferentially arranged first reflective wall, the secondary light source and the second reflective cup are arranged correspondingly, and the second reflective cup includes a circumferentially arranged second reflective wall, the first reflective wall and the central axis form a first included angle, the second reflective wall and the central axis form a second included angle, the first included angle is set to be greater than the second included angle.

the lighting part further comprises a lens assembly, the lens assembly includes a lens, and the lens is arranged on the main light source and the first reflector, and between the secondary light source and the second reflector.

the lens is arranged as a V-shaped lens.

a plurality of auxiliary light sources is provided, and the light sources are distributed radially around the central axis.

the rotating part comprises a fixed base plate and a rotating disc, the driving motor is mounted on the fixed base plate, and the rotating disc is fixedly connected with the illuminating part, and the rotating disc is connected with the driving motor in a driving manner.

the rotating part axially penetrates along the central axis to form an inner cavity, and an electric slip ring is arranged in the inner cavity, the electric slip ring includes a stator and a mover, wherein the mover is electrically connected with the lighting part.

the mounting part comprises a rear cover covering the top of the lamp holder, and a shock absorber pad is arranged between the rear cover and the rotating part.

the mounting portion is fixedly mounted on a mounting plate, and the mounting portion further comprises a buckle mounted on the outer wall of the lamp holder, a mounting ring is integrally formed at the bottom end of the lamp holder, and the snap and the mounting ring are respectively arranged on both sides of the mounting plate.

a shock-absorbing ring is arranged between the mounting ring and the mounting plate.

In a jewelry lighting method, using the jewelry lighting lamp described above, a main light source is used to illuminate the jewelry to form a main light spot with a brightness of $B_b$ and the range of the main light spot scope covers the jewelry, and at the same time, the rotating auxiliary light source is used to illuminate the polished facet on the periphery of the jewelry. The auxiliary light spot formed by the auxiliary light source is always included in the main light spot during rotation. The brightness of a single sub-spot is $B_a$, the brightness of the superimposed light spot formed by the main light spot and the sub-spot is $B_a+B_b$, and the superimposed light spot is equal to the ratio of the luminance difference $\Delta B$ of the main light spot to the luminance $B_b$ of the main light spot is set as the luminance contrast $C=B_a/B_b$, and the luminance contrast C is less than the critical luminance contrast $C_{pro}$.

The technical effects of the present invention:

1. By introducing the design of the principle of brightness and contrast, the problem of visible light and shadow at the edge of the aperture when there are main and auxiliary light sources of different brightness is solved. When jewelry flickering is observed, the light does not visibly waver.

2. The structure design of the reflector cup brings anti-glare function and solves the pain point of glare shining into a customer's eyes;

3. Use the control program to control the rotation of the entire lamp, and change the flickering effect of jewelry under lighting by adjusting the speed;

4. The use of shock absorption design solves the noise caused by vibration caused by the rotation of the lamp.

BRIEF DESCRIPTION OF THE DRAWINGS

Embodiments of the present invention will be described below with reference to the drawings, in which.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

Figure 1:
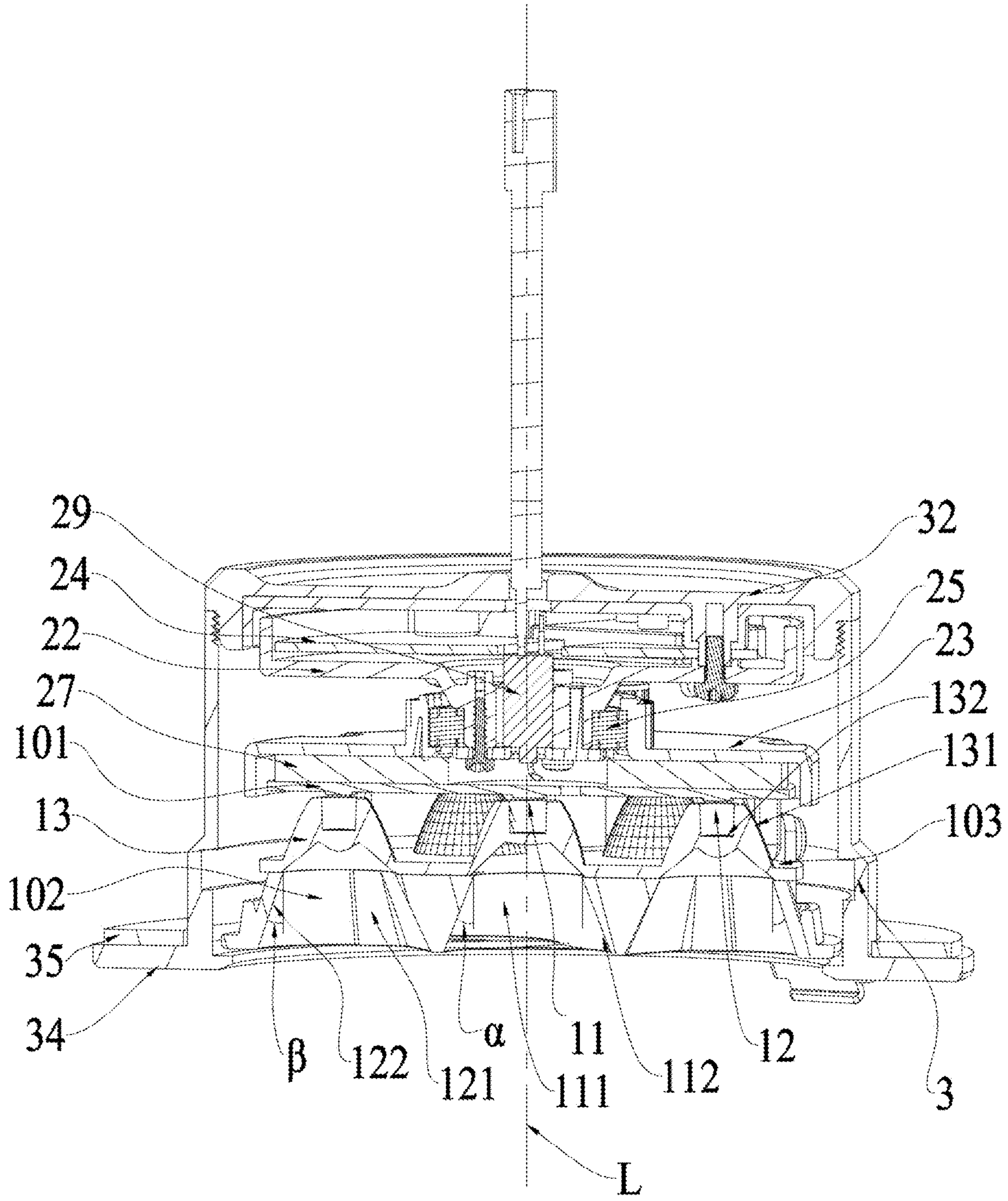
FIG. 1 is a profile structure diagram of the jewelry lighting lamp, cut in half through the center.
Figure 2:
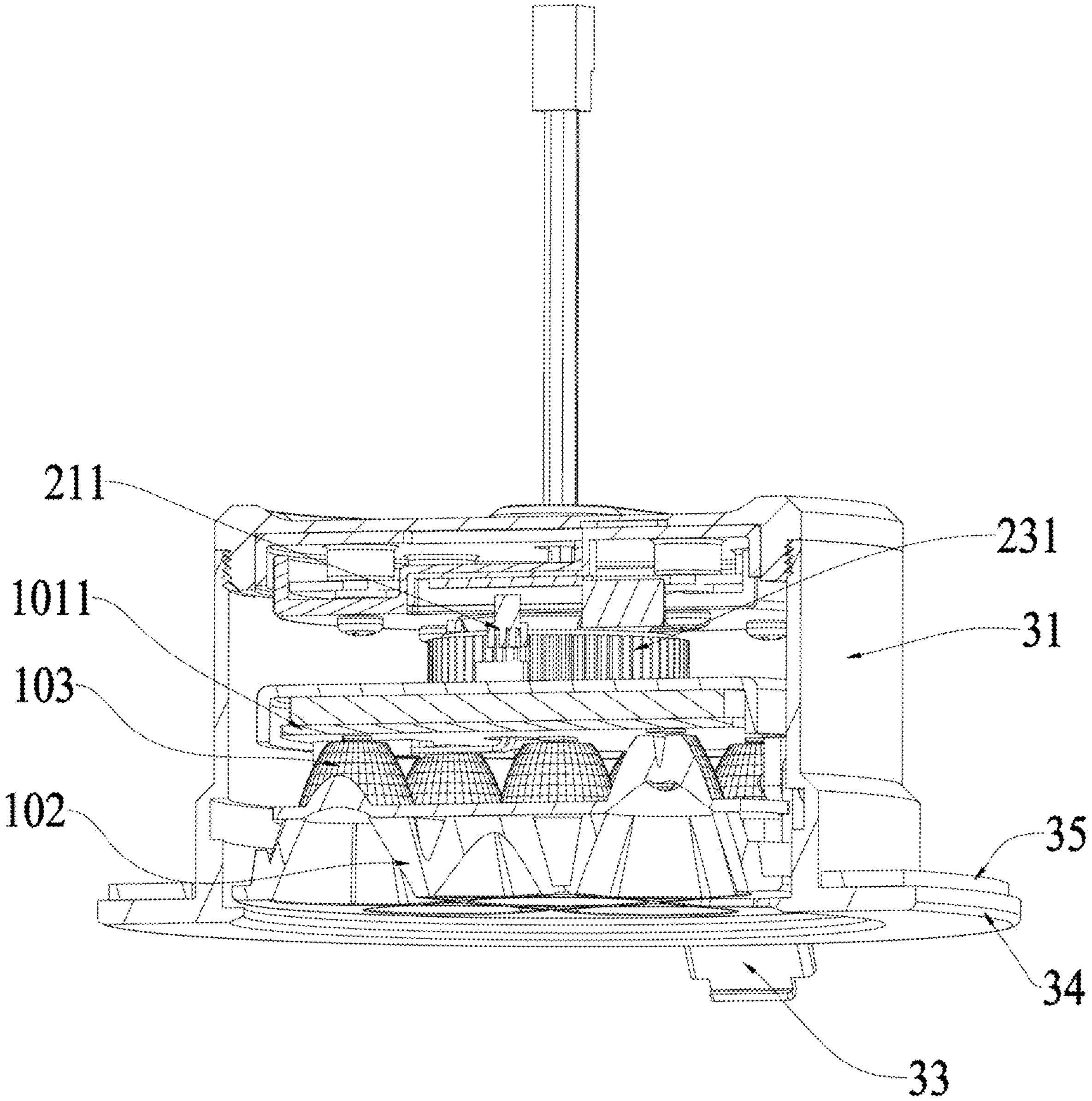
FIG. 2 is a profile structure diagram of the jewelry lighting lamp, cut not through the center.
Figure 3:
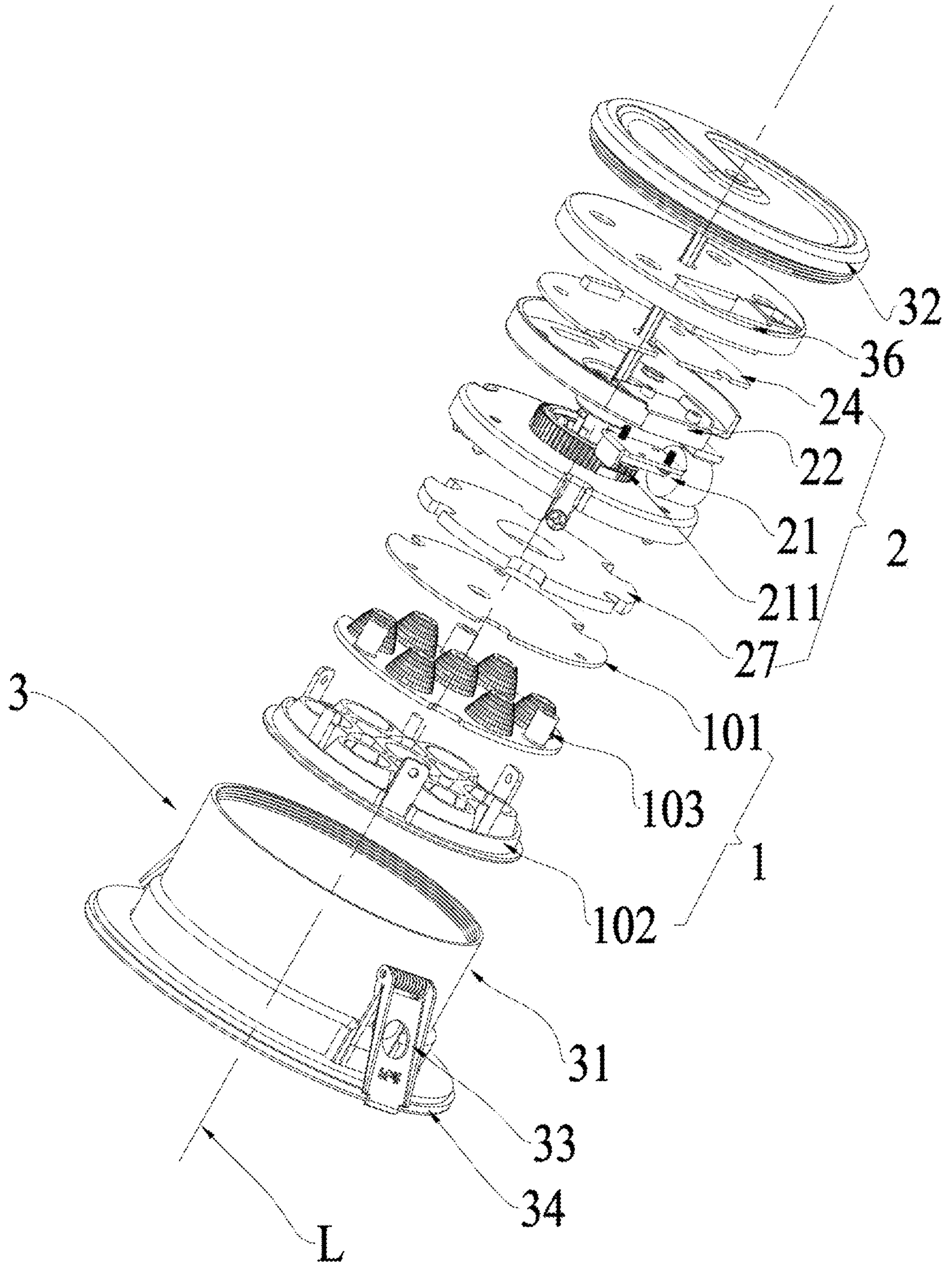
FIG. 3 is an exploded schematic diagram of the jewelry lighting lamp.

A jewelry lighting lamp provided by the invention is shown in FIGS. 1 to 3, including lighting part 1, rotating part 2 and mounting part 3, wherein: mounting part 3 includes lamp barrel 31, which accommodates lighting part 1 and rotating part 2; the rotating part 2 comprises a driving motor 21, the lighting part 1 rotates around the central axis L of the lamp barrel 31 relative to the lamp barrel 31; the lighting part 1 comprises a main light source 11 arranged on the central axis L and at least one secondary light source 12 arranged around the main light source 11. The main light source 11 and the secondary light source(s) 12 rotate along the central axis L circumferentially under the drive of the rotating part 2; the main light source 11 and the secondary light source 12 respectively form the main light spot 113 and the secondary light spot 123 in the irradiated area.

Specifically, lighting section 1 includes light plate assembly 101 and aperture assembly 102, light plate assembly 101 includes light plate 1011, and aperture assembly 102 includes reflective cup 1021. The main light source 11 and secondary light source 12 are arranged on the light plate 1011, and the main light source 11 and secondary light source 12 correspond to the reflective cup 1021 in the irradiation direction. Further, the main light source 11 corresponds to the first reflective cup 111, the first reflective cup 111 includes the circumferentially set first reflective wall 112, the secondary light source 12 corresponds to the second reflective cup 121, the second reflective cup 121 includes the circumferentially set second reflective wall 122, the first reflective wall 112 and the center axis L form the first angle α, The second reflective wall 122 forms a second angle β with the central axis L, and the first angle α is set to be greater than the second angle β.

Figure 4:
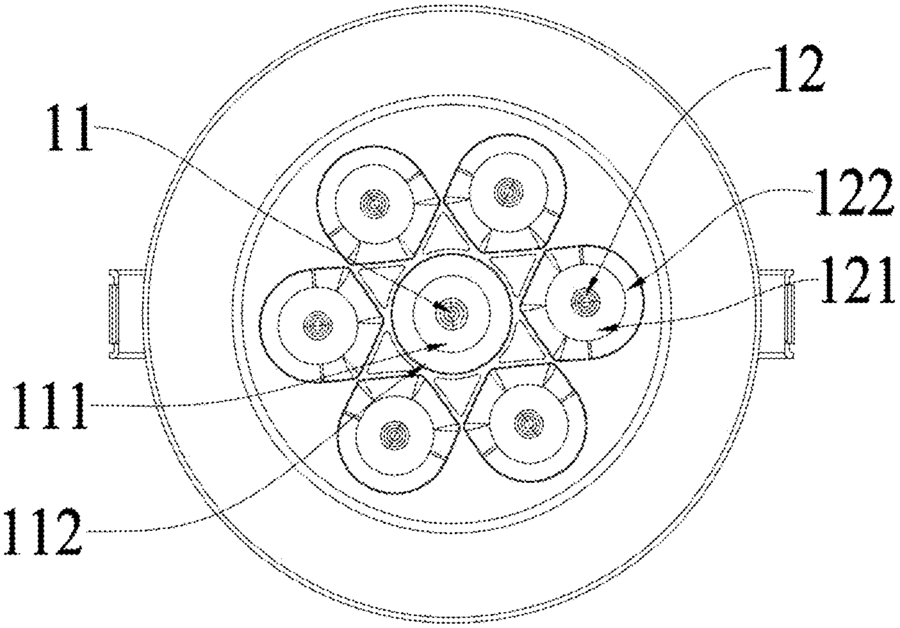
FIG. 4 is a frontal schematic diagram of the jewelry lighting lamp.
Figure 5:
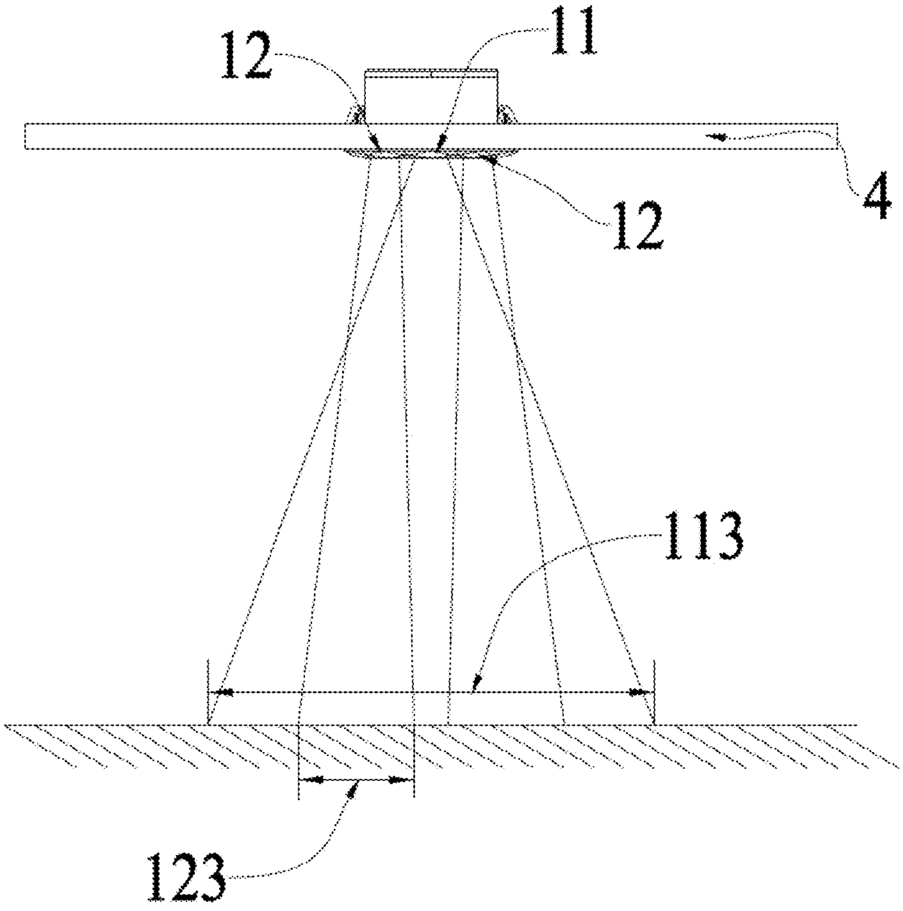
FIG. 5 is a schematic diagram of the spot range of the jewelry lighting lamp.
Figure 6:
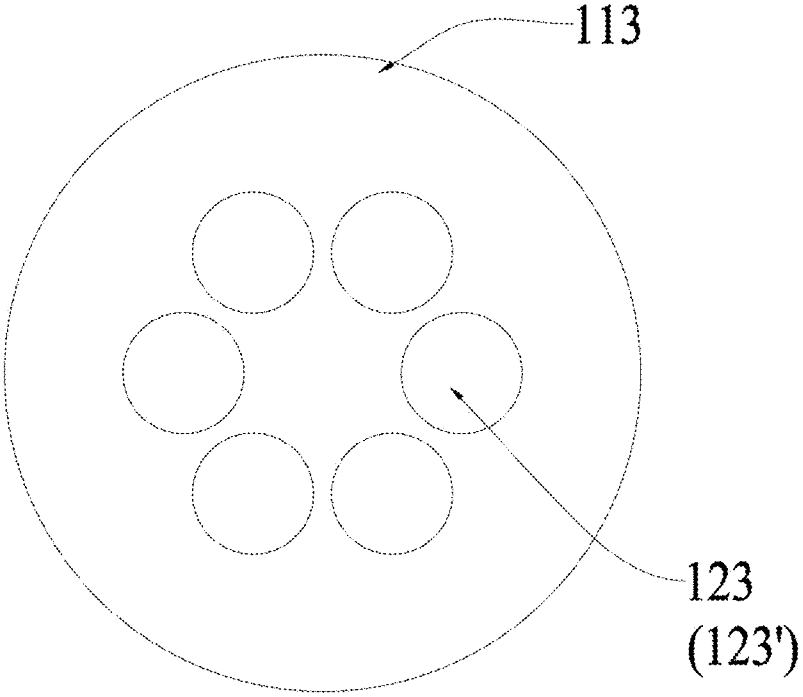
FIG. 6 is a schematic diagram of the main and secondary light spots of the jewelry lighting lamp (top view).

An embodiment of the jewelry lighting lamp of the present invention is shown in FIG. 4, where a plurality of secondary light sources 12 are arranged and distributed along the central axis L circumferentially. The main light source 11 and the secondary light source 12 can be PCB light beads mounted on the lamp board 1011, as shown in FIG. 4, where 6 secondary light sources 12 are uniformly set in the peripheral circumferences of the main light source 11. The aperture module 102 is a one-piece structure composed of a first reflective cup 111 and six second reflective cups 121. The first reflective cup 111 is a horn structure, the first reflective wall 112 is conical, the main light source 11 after the first reflective cup 111 reflection of the main spot 113 is a circular outline, the six second reflective cup 121 constitute a honeycomb structure composed of similar hexagonal cell grid. The reflective cup will reflect the light emitted from the main light source 11 and the secondary light source 12 to the outside, and the light is controlled in the set shading angle range, so as to avoid direct light to the human eye and achieve anti-glare effect. The main spot 113 illuminated by the main light source 11 through the first reflective cup 111, because the first angle α is large, the range of the main spot 113 includes the secondary spot 123 generated by the secondary light source 12 through the second reflective cup 121, which rotates with the secondary light source 12, and the moving range of the secondary spot 123 is within the main spot 113. The light spots formed on the irradiation surface of the jewelry lighting lamp of the invention are shown in FIGS. 5 and 6. In an embodiment of the invention, the first reflective cup 111 corresponds to the main light source 11, and the main light source 11 is arranged on the central axis L. The symmetry axis of the first reflective cup 111 coincides with the central axis L. When the main light source 11 rotates, the shape and size of the main light spot 113 formed by the main light source 11 remain unchanged, and the human eye cannot observe the change of the main light spot 113.

The lighting section 1 also includes a lens assembly 103, which includes a lens 13 arranged between the main light source 11 and the first reflective cup 111, and between the secondary light source 12 and the second reflective cup 121. The function of lens 13 is to distribute the outgoing light from primary light source 11 and secondary light source 12 so that the outgoing light passing through lens 13 is even.

Preferably, lens 13 is set as a V-shaped lens. The structure of lens 13 is shown in FIG. 2. The light source is located in the installation space. In the cross section of the lens coplanar with the optical axis, lens 13 is V-shaped, and the total reflector 131 is distributed along the cone surface around the periphery of lens 13.

Figure 7:
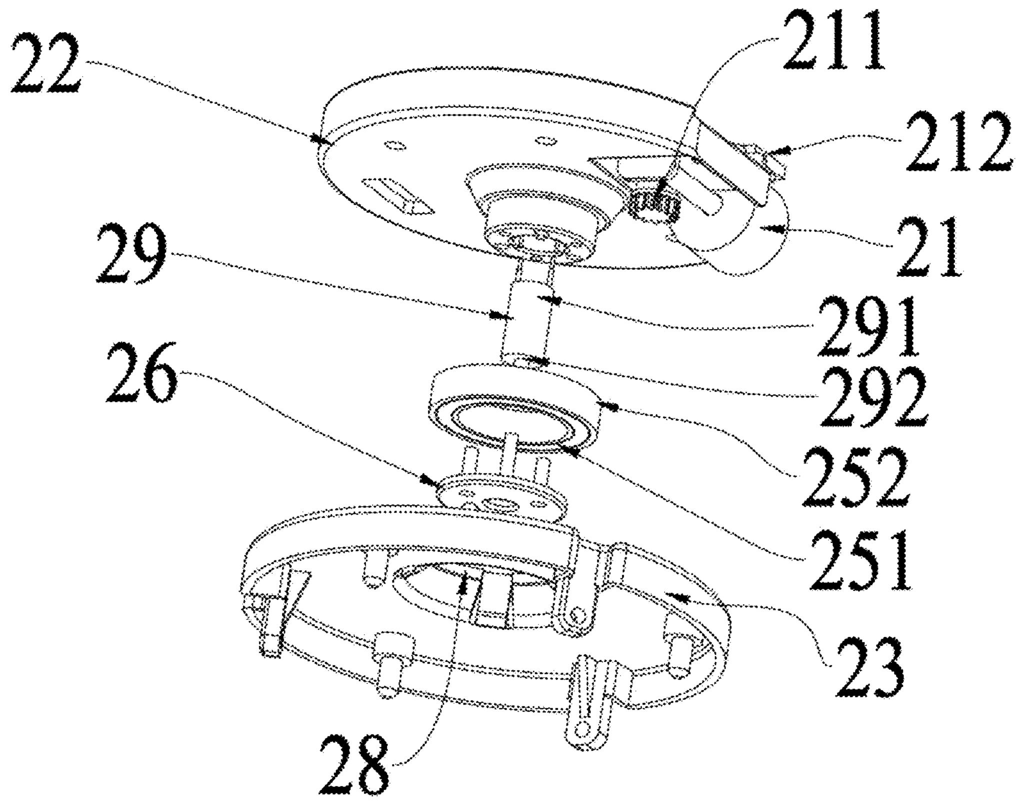
FIG. 7 is a structural diagram of the rotating part of the jewelry lighting lamp.

In the implementation scheme shown in FIG. 7, the rotating part 2 includes a fixed base plate 22 and a rotating plate 23. A driving plate 24 is installed on the top side of the fixed base plate 22, and a driving motor 21 is installed on the bottom side of the fixed base plate 22. The driving plate 24 is used to control the driving motor 21 and the light plate 1011. And the rotating disc 23 is connected with the driving motor 21. The output shaft of the driving motor 21 is connected with a driving gear 211, and the upper end of the rotating disc 23 is provided with a driven gear ring 231. The rotating shaft of the driven gear ring 231 coincides with the central axis L, and the driving gear 211 and the driven gear are meshed, so the driving motor 21 drives the rotation of the rotating disc 23. A heat dissipation block 212 is also arranged between the fixed base plate 22 and the driving motor 21 to conduct the heat of the driving motor 21 to avoid overheating of the motor.

The inner side of 231 driven gear ring is provided with bearing 25, bearing 25 includes a relatively rotating bearing inner ring 251 and bearing outer ring 252, bearing outer ring 252 is fixedly connected with the rotating disc 23, bearing inner ring 251 is provided with a shaft core 26, shaft core 26 is embedded with one end of the bearing inner ring 251, the other end is connected with the fixed substrate 22, To maintain the stable rotation of bearing 25.

The lamp board 1011 is connected to the bottom of the rotating plate 23, and a heat dissipation layer 27 is arranged between the lamp board 1011 and the rotating plate 23, which is used to export the heat of the lighting part 1. The lamp plate 1011, lens assembly 103 and aperture assembly 102 are fixed and connected by a connector, which can be selected as a clip, connector or screw, etc., which belong to conventional means in this field and will not be described here.

The rotating part 2 runs through the inner cavity 28 along the central axis L axis, and an electric slip ring 29 is set in the inner cavity 28. The electric slip ring 29 adopts the structure of the prior art, including stator 291 and actuator 292 at both ends, in which stator 291 faces the fixed substrate 22, stator 291 is electrically connected to the drive plate 24 through a wire, and the actuator 292 faces the lighting part 1. The actuator 292 is electrically connected to the light board 1011 through a wire, and the actuator 292 remains electrically connected when rotating relative to the stator 291. In this way, the electric connection between the drive board 24 and the light board 1011 is realized through the slip ring 29. In this way, the stator 291 of the fixed base plate 22, the shaft core member 26, the electric slip ring 29 and the inner ring 251 of the bearing are connected to form the immovable part, while the actuator 292 of the rotating disc 23, the electric slip ring 29 and the outer ring 252 of the bearing are connected to form the rotating part, so that the lighting part 1 connected to the rotating disc 23 is also relatively rotating. The connection of slip ring 29 can prevent the wire from winding and damaging with the rotation of lighting part 1.

The mounting part 3 includes a rear cover 32 covering the top of the lamp barrel 31. In order to reduce the vibration and noise brought by the rotating part 2, a shock absorber pad 36 is arranged between the rear cover 32 and the fixed base plate 22. The absorber pad 36 is optional but may be implemented with shock silica gel and other materials with damping effects.

Figure 8:
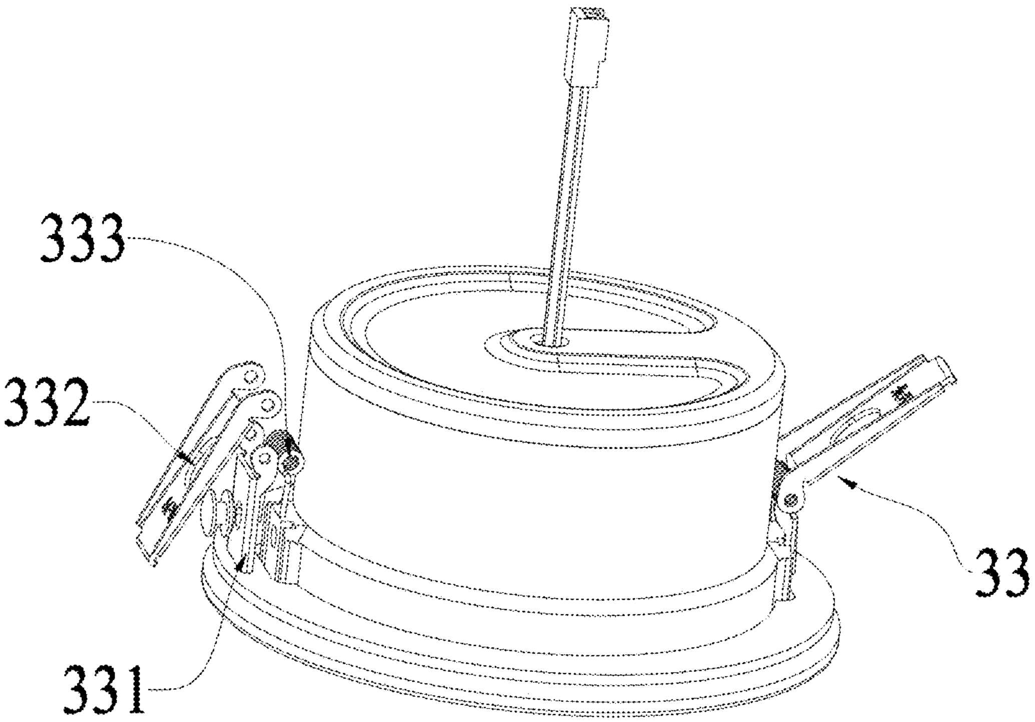
FIG. 8 is a schematic diagram of the external structure of the jewelry lighting lamp.

The jewelry lighting lamp provided by the invention is suitable for lighting jewelry mounted on a carrier, such as a display cabinet. Specifically, the mounting part 3 is fixed on a mounting plate 4, which is equipped with mounting holes for lamp barrel 31. The mounting part 3 also includes a buckle 33 mounted on the outer wall of lamp barrel 31, as shown in FIG. 8. The bottom end of lamp barrel 31 is provided with a mounting ring 34, and the buckle 33 and the mounting ring 34 are respectively arranged on both sides of the mounting plate 4. The buckle 33 has elastic folding function, mainly including base 331, swing arm 332 and torsion spring 333, base 331 is fixed on the outer wall of lamp 31. When in use, first open the buckle 33, pass the lamp barrel 31 through the mounting hole of the mounting plate 4 from bottom to top, make the upper side of the mounting ring 34 stick to the lower side of the mounting plate 4, then fold the buckle 33, make the swing arm 332 elastic return to the folded state, the buckle 33 elastic against the upper side of the mounting plate 4. Further, a shock absorbing ring 35 is arranged between the mounting ring 34 and the mounting plate 4 to reduce the vibration and noise caused by the rotating part 2 after installation.

The working principle of the jewelry lamp of the invention is as follows:

According to the principle of visual properties, if the brightness of the observed object is $B_0$ and its background brightness is $B_b$, the object can be found when the brightness difference $\Delta B = B_0 - B_b$ between object and background is greater than a critical brightness threshold. The larger the brightness difference, the easier it is to see.

The luminance difference between an object and its background ΔB, the ratio of B to the background luminance $B_b$ is defined as luminance contrast C:

$$C=(B_0-B_b)/B_b=\Delta B/B_b,$$

The critical luminance difference between the object and its background $\Delta B_{pro}$, and the ratio of the background luminance $B_b$, is the critical luminance contrast $C_{pro}$.

For an object to be visible, it must satisfy the following conditions: $\Delta B \geq \Delta B_{pro}$, or $C \geq C_{pro}$; on the other hand, if an object is to be hidden in the background, $\Delta B < \Delta B_{pro}$ or $C < C_{pro}$ should be satisfied.

Figure 9:
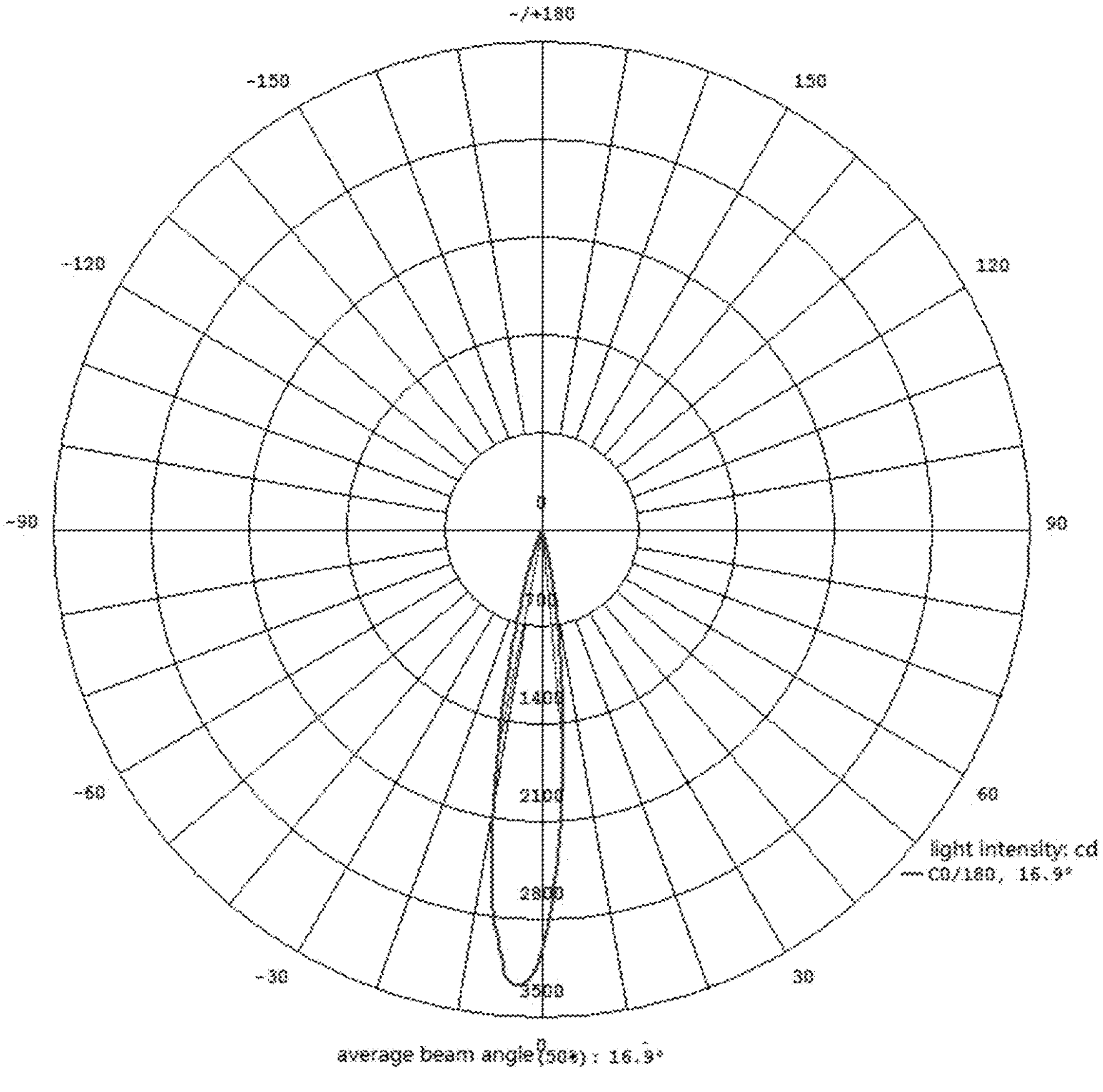
FIG. 9 is a light distribution curve of an example of a jewelry lamp.

The light distribution curve of an example product of the invention is shown in FIG. 9. The luminance value of the general jewelry lamp on the irradiation surface is in the order of $10^2$~$10^3$ cd/m$^2$, for example: when the luminance is arranged at a height of 500 mm and the illumination Angle of the main light source 11 is 15 degrees, a spot with a diameter of 268 mm is formed. According to the light distribution curve, the brightness value B of the most marginal direction (15°) of the irradiation surface is about 1000 cd/m$^2$, which is the brightness $B_b$ of the main light spot 113 as the background brightness.

Figure 10:
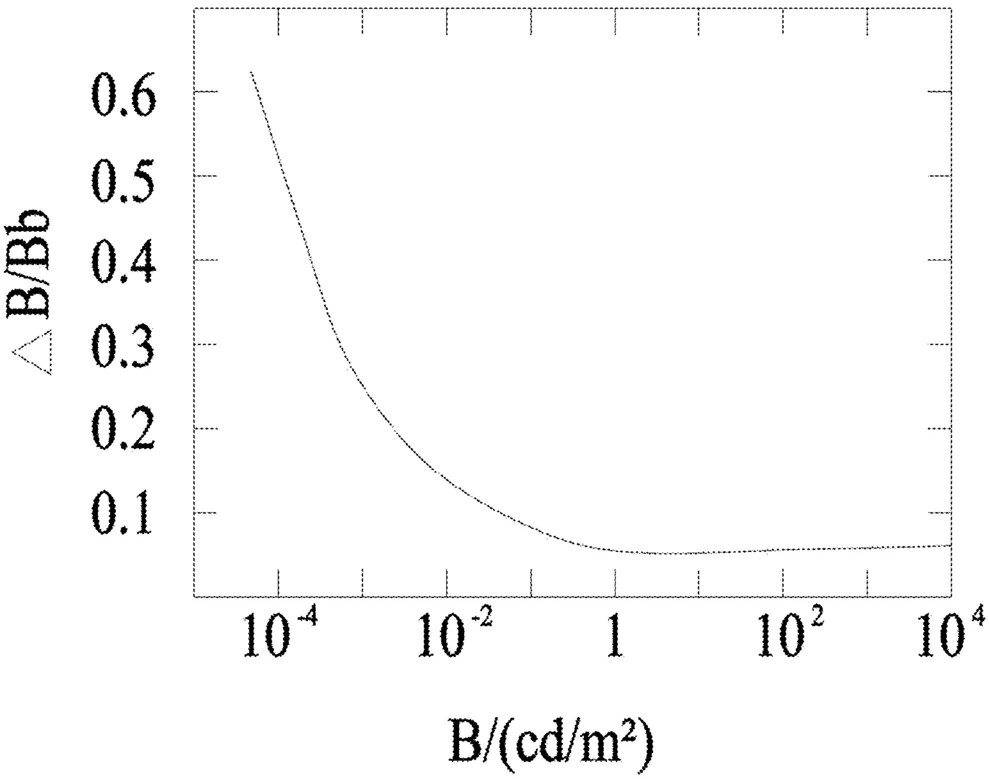
FIG. 10 shows the discriminative ability curve of human eyes for brightness contrast under different background brightness.

At the same time, FIG. 10 shows people's ability to discriminate brightness contrast under different background brightness. According to the brightness value range of jewelry lighting, when the vertical axis $C=\Delta B/B_b$ is less than $C_{pro}$, human eyes cannot distinguish the difference in brightness. Therefore, when the secondary light source 12 is used to illuminate the same area at the same time, and the brightness contrast $C=\Delta B/B_b$ is less than $C_{pro}$, the human eye cannot detect changes of the primary and secondary spot 123 even if the secondary light source 12 is rotating. Therefore, in the lighting part 1 of the jewelry lighting lamp of the present invention, the brightness of a single primary spot 113 is $B_b$, and the brightness of a single secondary spot 123 is $B_a$. As the secondary spot 123 is always within the range of primary spot 113 during the rotation process, the area illuminated by secondary spot 123 is actually the superimposed spot 123' formed by the primary spot and secondary spot 123. The size of the superimposed spot 123' is the same as that of the secondary spot 123, and the brightness of the superimposed spot 123' is $B_a+B_b$. The ratio between the luminance difference ΔB of the main spot 113 and the superimposed spot 123' and the luminance Bb of the main spot 113 was set as the luminance contrast $C=\Delta B/B_b$, and the luminance contrast C was less than the critical luminance contrast $C_{pro}$.

When the brightness contrast ratio is less than the critical brightness contrast $C_{pro}$, the human eye cannot perceive the change of the main spot since the brightness of the light spot 123 is not as small as possible. Because the jewelry cut surface reflects light, resulting in a twinkling visual effect, too little brightness weakens the desired scintillation reflection. According to FIG. 10, since the luminance value of general jewelry lighting on the irradiation surface is in the order of $10^2$~$10^3$ cd/$m^2$, it is desirable to set the luminance contrast C in the range of 0.02-0.05.

The present invention, when used to illuminate jewelry with rotating lamps and lanterns, provides background brightness centered with the main light source. The rotation of the lamp reflects light from the light source at different intervals into the human eye. The human eye observes scintillating reflection from the jewel facets while the spot produced by the secondary light source 12 is concealed, so consumers do not perceive the phenomenon of light rotation. While consumers see the dazzling light of jewelry, it also increases the attraction of jewelry, so as to improve the shopping experience.

The present invention also provides a jewelry lighting method by the use of the jewelry lighting lamp using the main light source 11 to form a main light spot 113 having brightness $B_b$ and the range of the main light spot 113 covering the jewelry, and uses the rotating auxiliary light source 12 to illuminate the jewelry. On the polished surfaces of the jewel facets, the secondary spot 123 is always included in the main light spot 113 during rotation, the luminance of a single main spot 113 is $B_b$, the luminance of a single secondary spot 123 is $B_a$, the luminance of the superimposed spot 123' formed by overlapping the main spot 113 and secondary spot 123 is $B_a+B_b$. The luminance difference Δ between superimposed spot 123' and the main spot 113 as the ratio of the main spot 113 is defined as luminance contrast $C=B_a/B_b$, and the luminance contrast C is less than the critical brightness contrast $C_{pro}$.

A better concrete embodiment of the invention is described in detail above. It should be understood that ordinary technicians in the field can make many modifications and changes based on the idea of the invention without creative labour. Therefore, any technical solution which can be obtained by the technical personnel in the technical field based on the concept of the invention on the basis of prior art by logical analysis, reasoning or limited experiments shall fall within the scope of protection determined by the claims.

What is claimed is:

1. A jewelry lighting lamp comprising a lighting part (1), a rotating part (2) and a mounting part (3), wherein, the mounting part (3) comprises a lamp barrel (31), which accommodates a lighting part (1) and a rotating part (2);

the rotating part (2) comprises a driving motor (21), which drives the lighting part (1) relative to the lamp (31) along the central axis (L) of the lamp (31); and the lighting part (1) comprises a main light source (11) arranged on the central axis (L) and at least one secondary light source (12) arranged around the main light source (11), and the main light source (11) and the at least one secondary light source (12) are driven by the rotating part (2) to rotate along the central axis (L) circumferentially.

2. The jewelry lighting lamp as claimed in claim 1, wherein the main light source (11) and the at least one secondary light source (12) respectively form a main light spot (113) and an auxiliary light spot (123) in an illuminated area, the main light spot (113) having a brightness $B_b$, the auxiliary light spot (123) having a brightness $B_a$, the auxiliary light spot (123) is always within an area of the main spot (113) during rotation, a superimposed light spot (123') formed by superpositioning the main light spot (113) and the auxiliary light spot (123) having a brightness $B_a+B_b$; a ratio of a brightness difference between the main light spot (113) and the superimposed light spot (123') $\Delta B=B_a$ and the brightness $B_b$ of the main light spot (113) is defined as a brightness contrast $C=B_a/B_b$, and the brightness contrast C is less than a critical brightness contrast $C_{pro}$.

3. The jewelry lighting lamp as claimed in claim 2, wherein the brightness contrast C is set to 0.02-0.05.

4. The jewelry lighting lamp as claimed in claim 1, wherein the lighting part (1) comprises a light plate assembly (101) and an aperture assembly (102), the light plate assembly (101) comprises a light plate (1011), and the aperture assembly (102) comprising a reflector (1021), the main light source (11) and the auxiliary light source (12) are arranged on the lamp board (1011), and the main light source (11) and the auxiliary light source (12) are aligned with the reflector (1021) in an irradiation direction with one-to-one correspondence.

5. The jewelry lighting lamp as claimed in claim 4, wherein in the aperture assembly (102), the main light source (11) is arranged corresponding to a first reflector (111), and the first reflector (111) includes a circumferentially arranged first reflective wall (112), the secondary light source (12) is arranged corresponding to a second reflective cup (121), and the second reflective cup (121) includes a circumferentially arranged second reflective wall (122), the first reflective wall (112)) and the central axis (L) form a first included angle (α), the second reflective wall (122) and the central axis (L) form a second included angle (β), the first included angle (α) is set to be greater than the second included angle (β).

6. The jewelry lighting lamp as claimed in claim 4, wherein the lighting part (1) further comprises a lens assembly (103), the lens assembly (103) includes a lens (13), and the lens (13) is arranged on the main light source (11) and a first reflector (111), and between the secondary light source (12) and a second reflector (121).

7. The jewelry lighting lamp as claimed in claim 6, wherein the lens (13) is arranged as a V-shaped lens.

8. The jewelry lighting lamp as claimed in claim 1, further comprising a plurality of secondary light sources (12), and the secondary light sources (12) are evenly distributed circumferentially along the central axis (L).

9. The jewelry lighting lamp as claimed in claim 1, wherein the rotating part (2) comprises a fixed base plate (22) and a rotating disc (23), the driving motor (21) is mounted on the fixed base plate (22), and the rotating disc (23) is fixed to the lighting part (1), and the rotating disc (23) is connected with the driving motor (21) in a driving manner.

10. The jewelry lighting lamp as claimed in claim 1, wherein the rotating part (2) axially penetrates along the central axis (L) to form an inner cavity (28), and an electric slip ring (29) is arranged in the inner cavity (28), the electric slip ring (29) includes a stator (291) and a mover (292), wherein the mover (292) is electrically connected to the lighting part (1).

11. The jewelry lighting lamp as claimed in claim 1, wherein the mounting part (3) comprises a rear cover (32) covering a top of the lamp holder (31), and a shock absorber pad (36) is disposed between the rear cover (32) and the rotating part (2).

12. The jewelry lighting lamp as claimed in claim 1, wherein the mounting portion (3) is fixedly mounted on a mounting plate (4), and the mounting portion (3) further comprises a buckle (33) mounted on the outer wall of the lamp holder (31), a mounting ring (34) is integrally formed at the bottom end of the lamp holder (31), and the buckle (33) and the mounting ring (34) are respectively arranged on both sides of the mounting plate (4).

13. The jewelry lighting lamp as claimed in claim 12, wherein a shock-absorbing ring (35) is arranged between the mounting ring (34) and the mounting plate (4).

14. A jewelry lighting method, using the jewelry lighting lamp as claimed in claim 1, comprising:

using the main light source (11) to form a main light spot (113) which covers the jewelry;

using the at least one secondary light source (12) to form an auxiliary light spot (123) to illuminate a cutting surface on a periphery of the jewelry, wherein the auxiliary light spot (123) is contained within the main light spot (113) during rotation;

forming a superimposed light spot (123') by superpositioning the auxiliary light spot (123) on the main light spot (113);

wherein the main light spot (113) has a brightness $B_b$, the auxiliary light spot (123) has a brightness $B_a$, and superimposed light spot (123') has a brightness $B_a+B_b$, a luminance contrast is defined as $C=B_a/B_b$, and the luminance contrast C is less than a critical luminance contrast $C_{pro}$.

* * * * *